Patented Jan. 19, 1926.

1,570,205

UNITED STATES PATENT OFFICE.

DAVID C. COLLIER, OF SANTA FE, NEW MEXICO.

METHOD OF RECOVERING OIL FROM OIL-BEARING SANDS.

No Drawing.     Application filed April 8, 1921. Serial No. 459,762.

*To all whom it may concern:*

Be it known that I, DAVID C. COLLIER, a citizen of the United States, residing at Santa Fe, in the county of Santa Fe and State of New Mexico, have invented certain new and useful Improvements in Methods of Recovering Oil from Oil-Bearing Sands, of which the following is a specification.

This invention relates to a method of recovering oil from oil bearing sands and other materials carrying free oil.

The method consists in mixing with the oil bearing sands, water and crushed carbonaceous material such as coal or coke (which may be of 20 to 200 mesh size) and then subjecting the mixture to a more or less violent agitation, shaking or stirring.

I have discovered if the agitation be maintained for a relatively short time, that the oil will separate from the sand and attach itself to the particles of the carbon, in the form of agglomerated masses of various sizes, which will float on the water. The sand, freed from oil, settles to the bottom of the receptacle and can be removed in any suitable manner.

The water used may be heated, if desired, and if preferably sufficient in quantity to make a readily fluent mixture.

The oil can be separated from the associated carbonaceous material by distillation, or the combined oil and carbon may be used as fuel.

Any form of agitator capable of producing the necessary agitation will accomplish the desired result.

I claim:

The method of separating oil from oil-bearing sands and the like which consists in mixing such material with water and subdivided carbonaceous material, and then subjecting the mixture to agitation, whereby the oil and carbonaceous material are agglomerated, and float on the water while the sand settles out.

In testimony whereof, I affix my signature.

DAVID C. COLLIER.